April 27, 1948.  A. KÉGRESSE  2,440,589
FEED DEVICE FOR HYDRAULICALLY OPERATED CHANGE-SPEED GEARS
Filed April 17, 1939  2 Sheets-Sheet 1

Inventor,
A. KEGRESSE
By Young, Emery & Thompson
attys.

April 27, 1948.　　　　A. KÉGRESSE　　　　2,440,589
FEED DEVICE FOR HYDRAULICALLY OPERATED CHANGE-SPEED GEARS
Filed April 17, 1939　　　2 Sheets-Sheet 2
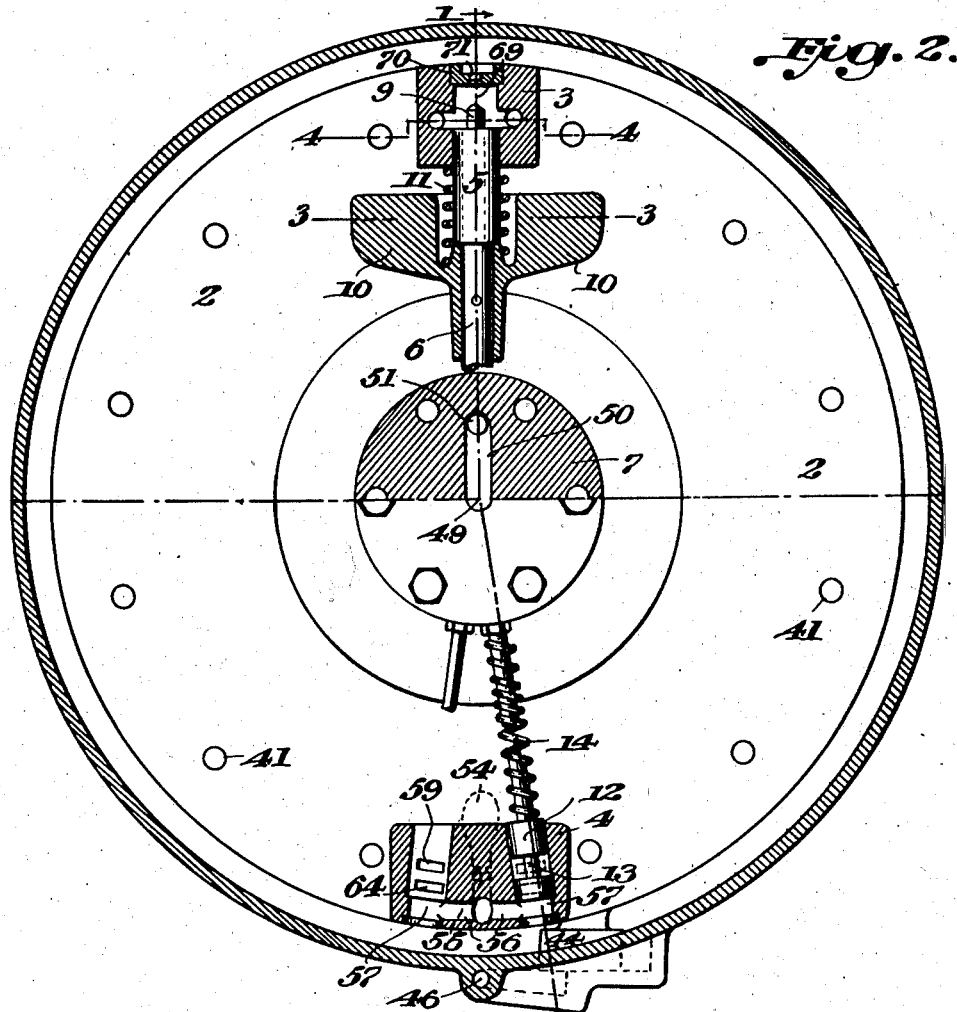

Patented Apr. 27, 1948

2,440,589

UNITED STATES PATENT OFFICE 2,440,589

FEED DEVICE FOR HYDRAULICALLY OPERATED CHANGE-SPEED GEARS

Adolphe Kégresse, Paris, France

Application April 17, 1939, Serial No. 268,419
In France April 16, 1938

Section 3, Public Law 690, August 8, 1946
Patent expires April 16, 1958

8 Claims. (Cl. 192—87)

(Granted under the provisions of sec. 14, act of
March 2, 1927; 357 O. G. 5)

This invention relates to improvements in feed devices for hydraulically operated change-speed gears.

Apparatus is known of the kind comprising a group of hydraulically operated clutches which are combined with gear trains so as to form hydraulically controlled change-speed gears, the arrangement being either automatic or manually controlled.

The invention concerns more particularly the provision of members for the admission of fluid, for example lubricating oil, to the clutches, and also the arrangement of the passages for the admission and discharge of the said fluid.

Experience has shown that in known apparatus of the aforesaid kind as described, for example, in applicant's U. S. Patents Nos. 2,143,321, 2,163,202, and 2,163,203, the devices corresponding to those provided according to the present invention did not ensure in a fully satisfactory manner the functions for which they were intended, either on account of friction or because the arrangement of the passages for the flow of the liquid and the members controlling said flow were not well provided. The result of these imperfections was irregular, and the excessively slow operation of the apparatus was detrimental to its practical application.

The present invention remedies these disadvantages and comprises improvements in the arrangement of the distribution members and the passages for the flow of the fluid.

According to the present invention a feed device for apparatus of the aforesaid kind wherein the clutches are arranged in a rotating housing, embodies a double acting radial valve mounted on the rotating clutch housing, said valve being so arranged that the part thereof adjacent the axis of the housing controls the admission of fluid to the device from the feed system, while the part of said valve adjacent the periphery of the housing controls the discharge of said fluid.

The accompanying drawings show, by way of example, a group of three clutches mounted directly on a driving shaft and controlling gear trains represented diagrammatically for forming a three-speed gear. This general arrangement is furthermore known.

In these drawings:

Figure 2 is a profile view with a part section on the line 2—2 of Figure 1.

Figure 3 is a section on the line 3—3 of Figure 2.

Figure 4 is a section on the line 4—4 of Figure 2.

The group of clutches shown by way of example is of the type having discs compressed by a movable plate to which hydraulic pressure is transmitted through the medium of an annular diaphragm corresponding to each movable plate. The diaphragms may of course be replaced by pistons without departing from the invention.

Likewise, the group of clutches may comprise a plurality of discs per speed stage or may be provided for 2 or 4 speeds.

Figure 1:
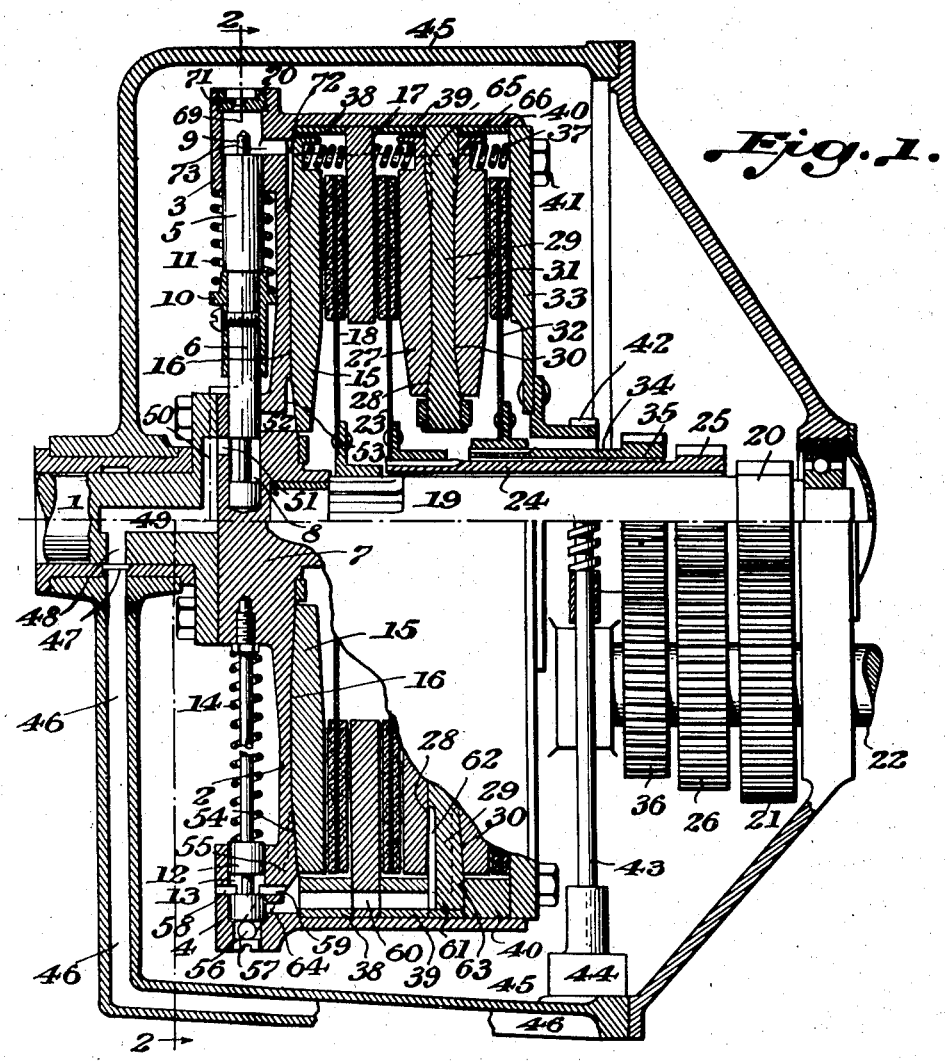
Figure 1 is a vertical section on the line 1—1 of Figure 2.

In Figure 1, the driving shaft 1 carries a plate 2 forming a drum on the face opposed to the shaft 1. The drum accommodates the fixed and movable clutch plates and also the diaphragms and return springs. The other face of the plate 2 carries two projections 3 and 4 (Figures 1, 2, 4, 5). The latter, however, without any inconvenience other than the weight, may form a solid continuous ring and thus take the place of a flywheel.

The projection 3 is pierced radially from one end to the other for receiving a valve 5, the lower part 6 whereof engages a likewise radial bore provided in the hub 7 of the plate 2. The lower part 6 of the valve 5 has a portion of reduced diameter to provide an annular space 8.

The top of the valve 5 carries a point 9. The valve 5—6 is provided at its middle with a permanently fixed calibrated weight 10. A spring 11, when the device is stopped, returns the valve 5—6 towards the centre by moving it to the position shown in the drawings.

The projection 4 is pierced with two radial openings each of which is provided with a valve 12 having an annular recess 13. Each of said valves is urged towards the periphery by means of a calibrated spring 14. The two valves ensure the distribution of the fluid for the second and third speeds.

The arrangement of the clutches themselves and the corresponding gears is known from the aforesaid U. S. Patents. In Figure 1, the movable plate 15 on being thrust by the diaphragm 16 is adapted to apply against the fixed plate 17, the movable disc 18 which is splined on one end of the shaft 19, which is fast at its other end with a pinion 20 meshing with a gear wheel 21 mounted in free-wheel fashion on the driven shaft 22. This transmission gives the first speed.

The disc 23 mounted on the hollow shaft 24 fast with the pinion 25 meshing with the gear wheel 26 also mounted in free-wheel fashion on the driven shaft 22 gives the second speed. The disc 23 is adapted to be pressed by the movable plate 27, against which the diaphragm 28 bears. The latter is held against one face of the fixed plate 29, which receives on its other face the diaphragm 30 controlling the movable plate 31 adapted to press the disc 32 against the inner face of the plate 33, also forming as it were the cover of the drum of plate 2.

The disc 32 drives the hollow shaft 34 fast with the pinion 35 meshing with the gear wheel 36, itself fast with the driven shaft 22 for giving the third speed.

The springs 37 return the movable plates 15, 27 and 31 to their starting position. The annular struts 38, 39 and 40 maintain the fixed plates in their respective positions and at the same time, provide fluid distributing passages, as will be seen hereinafter. The whole is assembled by the bolts 41.

The outer plate 33 has near its centre a helical gear wheel 42 driving the small vertical shaft 43 actuating the pump 44 situated in the lower part of the casing 45 enclosing the entire mechanism. Said pump 44, immersed in the oil of the casing, forces the latter through the tubular passage 46 as far as a collector 47 forming a bearing, in Figure 1. Obviously, said collector may be independent of the bearing. The shaft of the collector, which in this case is the driving shaft 1, is provided with a bore which has a radial portion 48 and an axial portion 49. The latter opens into a radial passage 50 communicating by the orifice 51 provided in the hub 7 of the plate 2 with the groove 8 in the lower part 6 of the valve 5.

Another orifice 52, diametrically opposed to the orifice 51, relatively to the valve 6, and offset axially relatively to said orifice, communicates with a small annular chamber 53 formed in the plate 2 behind the central portion of the first-speed diaphragm 16.

A second annular chamber 54, shown in dotted lines in Figures 1 and 2 and provided in the periphery of the plate 2, behind the diaphragm 16, communicates by the orifice 55 with a transverse passage 56 provided in the projection 4 of the plate 2, each of the ends of said passage terminating in the annular space 57 formed in the top of the fluid distributing valves 12.

Each of the valves 12 in the position shown in Figures 1 and 2, that is to say at rest, uncovers an orifice 58 communicating with the exterior, and another orifice 59 diametrically opposed to the orifice 58. Each orifice 59 communicates respectively by a separate passage 60 and 61 (the end of the latter is shown in dotted lines in Figure 1) with a chamber 62, 63 (the latter is shown in dotted lines) provided on the periphery of the fixed plate 29, the chamber 62 opening behind the diaphragm 28 of the second speed and the chamber 63 behind the diaphragm 30 of the third speed.

The passages 60 and 61 are also in communication with an opening 64 parallel to the opening 59. The opening 64, in the position in the figures, is covered by the valve 12.

The periphery of the fixed plate 29 also has two other chambers 65, 66 (Figure 4) almost opposite the chambers 62, 63 and shown in dotted lines in Figure 1, likewise provided behind the diaphragms 28 and 30 and communicating by the passages 67 and 68 (Figure 4) with the chamber 69 of the projection 3 formed by the top of the valve 5 and a stopper 70 pierced by a hole 71 of a smaller diameter than the point 9 of the valve 5.

The plate 2 has a third chamber 72 (Figures 1 and 4) situated behind the diaphragm 16 and at the periphery of the latter. Said chamber 72 communicates by the orifice 73 with the chamber 69 of the projection 3.

Figure 5:
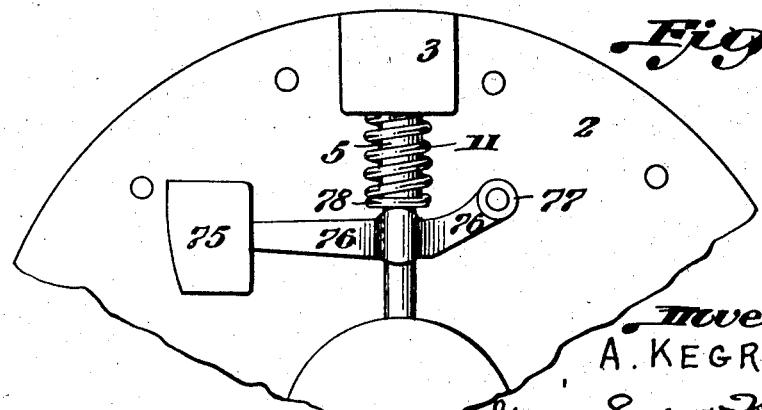
Figure 5 shows in section a modification of the control device.

Figure 5 shows a constructional modification of the centrifugal control of the valve 5—6. A weight 75 is disposed on the end of a lever 76 pivoted to a pin 77 fixed to the plate 2. The lever 76 acts on a collar 78 integral with the valve 5—6. Said collar 78 also bears on the return spring 11 of the valve 5—6.

The operation is as follows:

When the engine is started, the pump 44 which rotates with it draws lubricating oil and forces it through the passage 46 to the collector 47. Through the passages 48, 49 and 50 and the orifice 51, the oil enters the annular space 8.

If the engine speed is low, the valve 5—6 remains in the position of Figure 1 and the oil does not pass beyond the space 8, there being no outlet open. On the contrary, as soon as the engine speed increases, the valve 5—6 loaded by the weight 10 compresses the spring 11 under the action of the centrifugal force and thus moves towards the periphery, uncovering the orifice 52 which it puts into communication by the space 8 with the orifice 51 connected to the collector 47 and consequently to the pump 44.

The stroke of the valve 5—6 is limited towards the periphery by the point 9 which obstructs the hole 71 of the stopper 70. The oil passes through the orifice 52 and the chamber 53 behind the first-speed diaphragm 16, and distends the said diaphragm which then moves the movable plate 15, the latter pressing the first-speed disc 18 against one of the faces of the fixed plate 17, and thus causing the first speed train to be driven. The oil compressed behind the first-speed diaphragm 16 seeks to escape through the chamber 72, orifice 73 and chamber 69 but does not find there any outlet as long as the centrifugal force keeps the point 9 of the valve 5 applied against the stopper 70, and also, through the chamber 54 and the passages 55 and 56 which lead it into the small chamber 57 provided in the outer part of the valve 12 of the second and third speeds.

These valves 12, the weight of which balances, in respect of the centrifugal force, that of the column of oil feeding them, are known from the specifications of applicant's previously mentioned U. S. Patents Nos. 2,143,321 and 2,163,202. They are held on their seats respectively by the springs 14 of different graded tensions, the spring of the second-speed valve being distinctly weaker than that of the third-speed valve. It follows that as soon as the oil pressure behind the diaphragm 16 has attained a sufficient value, the second-speed valve 12 opens and allows the oil under pressure to pass through the conduits 64, 60 and chamber 62 and distend the second-speed diaphragm 28 which, by moving the plate 27 causes it to apply and press the disc 23 against the other face of the fixed plate 17. The second speed then becomes operative.

The oil pressure then continues to increase, since no outlet is offered to it, and attains a force greater than that of the spring 14 acting on the third-speed valve 12. The latter opens in its turn, under the action of the pressure, for directing the fluid through the passages 61 to the chamber 63 provided behind the third-speed diaphragm 30. The latter is distended in its turn and, through the medium of the movable plate 31, presses the disc 32 against the inner face of the plate 33, thus driving the third speed gear train.

If now, for any reason whatsoever, the oil pressure drops sufficiently, the valves 12 put the chambers formed behind the diaphragms 28 and 30 into communication with the exterior via the passages 60 and 61, groove 13 and discharge orifice 58.

If, when the vehicle is running normally, it is stopped very abruptly by a sudden application of the brakes, it will be appreciated that the weight 10, the effect of the centrifugal force on which is greatly reduced on account of the sudden slowing down, is returned rapidly towards the centre under the action of the spring 11, carrying with it the valve 5—6. The orifice 71 is immediately uncovered and permits the centrifugal discharge of the oil contained behind the diaphragms, through the medium of the conduit 73 for the first speed, and that of the passages 67—68 for the second and third speeds. At the same time as the point 9 uncovers the orifice 71, the valve 5—6 shuts off the admission of oil through the orifice 52, since it then re-assumes the position shown in Figure 1. At the same instant, the valves 12 themselves become operative for putting into communication with the exterior the chambers formed behind the diaphragms of the second and third speeds, as in the above-mentioned case of a simple drop in pressure. It will be seen therefore that the discharge of the oil from behind the diaphragm is practically instantaneous, since it may be effected at several points simultaneously.

The advantages of the device according to the invention relatively to the known constructions reside in the following points:

More reliable operation of the fluid admission valve 5—6, due to the weight 10, or to the lever-weight device of Figure 5, which renders it less sensitive to passive resistances: such as friction, rupture of the oil film or expansions.

Double function of the valve 5—6 which regulates the admission of fluid and its discharge in a simple manner.

Without detriment to the discharge of the fluid which always takes place under the effect of the centrifugal force, a quicker start is obtained, due to the centre filling of the first speed diaphragm, said filling being controlled directly by the lower part 6 of the general fluid admission valves 5, said part being very close to the first speed diaphragm, while retaining the peripheral discharge. In fact, if the engine is running slow, the fluid filling the space 8 is ready to flow very rapidly, at the slightest acceleration of engine, behind the the first-speed diaphragm 16 under the twofold action of the pressure and centrifugal force. The path which it has to flow through being very limited, it will be appreciated that the filling of the chamber behind the first-speed diaphragm will be almost instantaneous, without on that account impairing the discharge of said chamber when necessary, since such discharge will be effected through an opposite orifice situated on the periphery, that is to say under action of the centrifugal force. This arrangement permits instantaneous starting. As the fluid has no distance to travel, its action is immediate which was not the case with the known devices.

I claim:

1. In a feed device for clutches with hydraulically compressed discs wherein the clutches are arranged in a rotating housing, a double-acting radial valve mounted on the rotating clutch housing, the part thereof adjacent the axis of the housing controlling the admission of fluid to the device from the feed system, the part of said valve adjacent the periphery of the housing controlling the discharge of said fluid, a pivoted lever engaging said valve for actuating the latter, and a centrifugal weight fixed to the end of the lever acting on said valve.

2. In a feed device for clutches with hydraulically compressed discs wherein the clutches are arranged in a rotating housing, a rotary plate, a first-speed-stage diaphragm carried by said plate, said plate having an admission valve chamber adjacent the axis thereof and a discharge valve chamber adjacent the periphery thereof, and a centrifugally responsive double-acting radial valve common to both chambers, said admission valve chamber having a port placing said chamber in communication with said diaphragm when uncovered by said valve.

3. In a feed device for clutches with hydraulically compressed discs wherein the clutches are arranged in a rotating housing, a rotary plate, a first-speed-stage diaphragm carried by said plate, said plate having an admission valve chamber adjacent the axis thereof and a discharge valve chamber adjacent the periphery thereof, and a centrifugally responsive double-acting radial valve common to both chambers, said admission valve chamber having a port placing said chamber in communication with said diaphragm when uncovered by said valve, and said discharge valve chamber having a port communicating with said diaphragm and adapted to be covered by said valve when displaced radially outward by centrifugal force and uncovered to relieve fluid pressure in said diaphragm upon the reduction of speed of rotation of said plate.

4. In a feed device for clutches with hydraulically compressed discs wherein the clutches are arranged in a rotating housing, a rotary plate, a first-speed-stage diaphragm carried by said plate, said plate having an admission valve chamber adjacent the axis thereof and a discharge valve chamber adjacent the periphery thereof, and a centrifugally responsive double-acting radial valve common to both chambers, said discharge valve chamber having a port communicating with said diaphragm and adapted to be covered by said valve when displaced radially outward by centrifugal force and uncovered to relieve fluid pressure in said diaphragm upon the reduction of speed of rotation of said plate.

5. In a feed device for clutches with hydraulically compressed discs wherein the clutches are arranged in a rotating housing, a rotary plate, a first-speed-stage diaphragm carried by said plate, said plate having an admission valve chamber adjacent the axis thereof and a discharge valve chamber adjacent the periphery thereof, a centrifugally responsive double-acting radial valve common to both chambers, said discharge valve chamber having a port communicating with said diaphragm and an outlet orifice, a pointed member carried by said valve for closing said orifice when the valve is displaced outwardly by centrifugal force, and means for displacing said valve radially inwardly, upon the reduction of the centrifugal force, to open said orifice.

6. In a feed device for clutches with hydraulically compressed discs wherein the clutches are arranged in a rotating housing, a rotary plate, a first-speed-stage diaphragm carried by said plate, said plate having an admission valve chamber adjacent the axis thereof and a discharge valve chamber adjacent the periphery thereof, a centrifugally responsive double-acting radial valve common to both chambers, said discharge valve chamber having a port communicating with said diaphragm and adapted to be covered by said valve when displaced radially outward by centrifugal force and uncovered to relieve fluid pressure in said diaphragm upon the reduction of speed of rotation of said plate, a plurality of other speed-stage diaphragms, said plate having other valve chambers, one for each other speed-stage diaphragm, communication ducts extending between said other speed-stage diaphragms and the corresponding valve chambers, a communication duct extending from said first-speed-stage diaphragm to said other valve chambers, and valves in said other valve chamber responsive to successive pressure increases for successively placing said other speed-stage diaphragms in communication with said first-speed-stage diaphragm.

7. In a feed device for clutches with hydraulically compressed discs wherein the clutches are arranged in a rotating housing, a rotary plate, a first-speed-stage diaphragm carried by said plate, said plate having an admission valve chamber adjacent the axis thereof and a discharge valve chamber adjacent the periphery thereof, a centrifugally responsive double-acting radial valve common to both chambers, said admission valve chamber having a port placing said chamber in communication with said diaphragm when uncovered by said valve, said discharge valve chamber having a port communicating with said diaphragm and adapted to be covered by said valve when displaced radially outward by centrifugal force and uncovered to relieve fluid pressure in said diaphragm upon the reduction of speed of rotation of said plate, a plurality of other speed-stage diaphragms, said plate having other valve chambers, one for each other speed-stage diaphragm, communication ducts extending between said other speed-stage diaphragms and the corresponding valve chambers, a communication duct extending from said first-speed-stage diaphragm to said other valve chambers, and valves in said other valve chamber responsive to successive pressure increases for successively placing said other speed-stage diaphragms in communication with said first-speed-stage diaphragm.

8. In a feed device for clutches with hydraulically compressed discs wherein the clutches are arranged in a rotating housing, a rotary plate, a first-speed-stage diaphragm carried by said plate, said plate having an admission valve chamber adjacent the axis thereof and a discharge valve chamber adjacent the periphery thereof, a centrifugally responsive double-acting radial valve common to both chambers, said discharge valve chamber having a port communicating with said diaphragm and adapted to be covered by said valve when displaced radially outward by centrifugal force and uncovered to relieve fluid pressure in said diaphragm upon the reduction of speed of rotation of said plate, a plurality of other speed-stage diaphragms, said plate having other valve chambers, one for each other speed-stage diaphragm, communication ducts extending between said other speed-stage diaphragms and the corresponding valve chambers, a communication duct extending from said first-speed-stage diaphragm to said other valve chambers, valves in said other valve chamber responsive to successive pressure increases for successively placing said other speed-stage diaphragms in communication with said first-speed-stage diaphragm, and conduits placing said other speed-stage diaphragms in communication with said discharge valve chamber and adapted to be closed off when said discharge valve is in its radial outer position.

ADOLPHE KÉGRESSE.

REFERENCES CITED

The following references are of record in the file of this patent:

UNITED STATES PATENTS

| Number | Name | Date |
|---|---|---|
| 635,684 | Herschmann | Oct. 24, 1899 |
| 1,579,540 | Jackson | Apr. 6, 1926 |
| 1,661,613 | Jackson | Mar. 6, 1928 |
| 1,866,891 | Jackson | July 12, 1932 |

FOREIGN PATENTS

| Number | Country | Date |
|---|---|---|
| 402,912 | Germany | Sept. 24, 1924 |
| 432,137 | Germany | July 27, 1926 |
| 41,842 | Netherlands | Oct. 15, 1937 |